US007463376B2

(12) United States Patent
Bezenek

(10) Patent No.: US 7,463,376 B2
(45) Date of Patent: Dec. 9, 2008

(54) PRINT FINISHING METHOD AND APPARATUS

(75) Inventor: Myron A. Bezenek, San Marcos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 844 days.

(21) Appl. No.: 10/060,449

(22) Filed: Jan. 30, 2002

(65) Prior Publication Data

US 2003/0142343 A1 Jul. 31, 2003

(51) Int. Cl.
*G06F 15/00* (2006.01)
*B41J 1/00* (2006.01)

(52) U.S. Cl. ...................... 358/1.15; 358/1.16; 358/1.2; 358/1.18; 347/5

(58) Field of Classification Search ................ 358/1.18, 358/1.15, 1.2, 121.15, 1.16
See application file for complete search history.

(56) References Cited

U.S. PATENT DOCUMENTS

| | | | | | |
|---|---|---|---|---|---|
| 5,165,967 | A | * | 11/1992 | Theno et al. | 427/264 |
| 5,232,538 | A | * | 8/1993 | Liu | 156/359 |
| 5,293,537 | A | * | 3/1994 | Carrish | 399/329 |
| 5,467,434 | A | * | 11/1995 | Hower et al. | 358/1.15 |
| 5,628,249 | A | | 5/1997 | Cordery et al. | |
| 5,752,122 | A | * | 5/1998 | Ishikawa | 396/612 |
| 6,030,132 | A | * | 2/2000 | Harman et al. | 400/62 |
| 6,226,471 | B1 | * | 5/2001 | Tsuzuki | 399/75 |
| 6,249,835 | B1 | * | 6/2001 | Isoda | 710/100 |
| 6,654,140 | B1 | * | 11/2003 | Hirata | 358/1.18 |
| 6,683,701 | B1 | * | 1/2004 | Matama | 358/1.9 |
| 6,707,574 | B1 | * | 3/2004 | Freeman et al. | 358/1.9 |
| 6,797,086 | B2 | | 9/2004 | Boleda | |
| 6,869,650 | B2 | | 3/2005 | Burch | |
| 6,902,643 | B2 | | 6/2005 | Arcaro | |
| 6,954,279 | B2 | * | 10/2005 | Matsubayashi | 358/1.15 |
| 2001/0055123 | A1 | * | 12/2001 | Ryan et al. | 358/1.12 |
| 2003/0117638 | A1 | * | 6/2003 | Ferlitsch | 358/1.13 |

* cited by examiner

*Primary Examiner*—Kimberly A Williams

(57) ABSTRACT

A printing and finishing system includes a printing device for producing a print according to printing parameters and a finishing device for finishing the print according to finishing parameters. In one implementation, the system includes a controller configured for two-way communication between the printing device and the finishing device. The implementation may allow the controller to adjust at least one of the printing parameters in response to at least one of the finishing parameters and allows the controller to adjust at least one of the finishing parameters in response to at least one of the printing parameters. The implementation may be configured so that the controller operates the printing device using the at least one printing parameter adjusted in response to at least one finishing parameter and operates the finishing device using the at least one finishing parameter adjusted in response to at least one printing parameter.

31 Claims, 10 Drawing Sheets

EXEMPLARY PRINTING AND FINISHING PROCESS

EXEMPLARY PRINTING AND FINISHING PROCESS

PRINT FINISHING METHOD AND APPARATUS

TECHNICAL FIELD

The subject matter disclosed herein relates to the finishing of print media (e.g., prints). More specifically, the present invention relates to methods and apparatus for adjusting print and finish parameters to improve image quality.

BACKGROUND

Images produced with conventional printing systems, such as laser or inkjet printers, typically suffer degradation when exposed over time to environmental factors. To improve the longevity of images, a finishing process may be used after printing. The finishing process may include, for example, applying an overcoat material to the image, and then applying heat or pressure to the image.

Unfortunately, "finishing" a print typically requires a separate operation, usually with the intervention by an operator. The finishing process may also interact with the printed image, causing color shifts and other degradations of image quality. A need therefore exists for methods and devices for finishing prints, in particular, wherein the printing and finishing parameters are adjusted to insure image quality.

SUMMARY

A printing and finishing system includes a printing device for producing a print according to printing parameters and a finishing device for finishing the print according to finishing parameters. In one implementation, the system includes a controller configured for two-way communication between the printing device and the finishing device. The implementation may allow the controller to adjust at least one of the printing parameters in response to at least one of the finishing parameters and allows the controller to adjust at least one of the finishing parameters in response to at least one of the printing parameters. The implementation may be configured so that the controller operates the printing device using the at least one printing parameter adjusted in response to at least one finishing parameter and operates the finishing device using the at least one finishing parameter adjusted in response to at least one printing parameter.

Other aspects and advantages of the present invention will become apparent from the following detailed description, taken in conjunction with the accompanying drawings, illustrating by way of example the principles of the invention.

BRIEF DESCRIPTION OF THE DRAWINGS

Various exemplary devices and methods are illustrated by way of example and not limitation in the figures of the accompanying drawings. The same numbers are used throughout the figures to reference like components and/or features.

DESCRIPTION OF THE INVENTION

Summary

Figure 1:
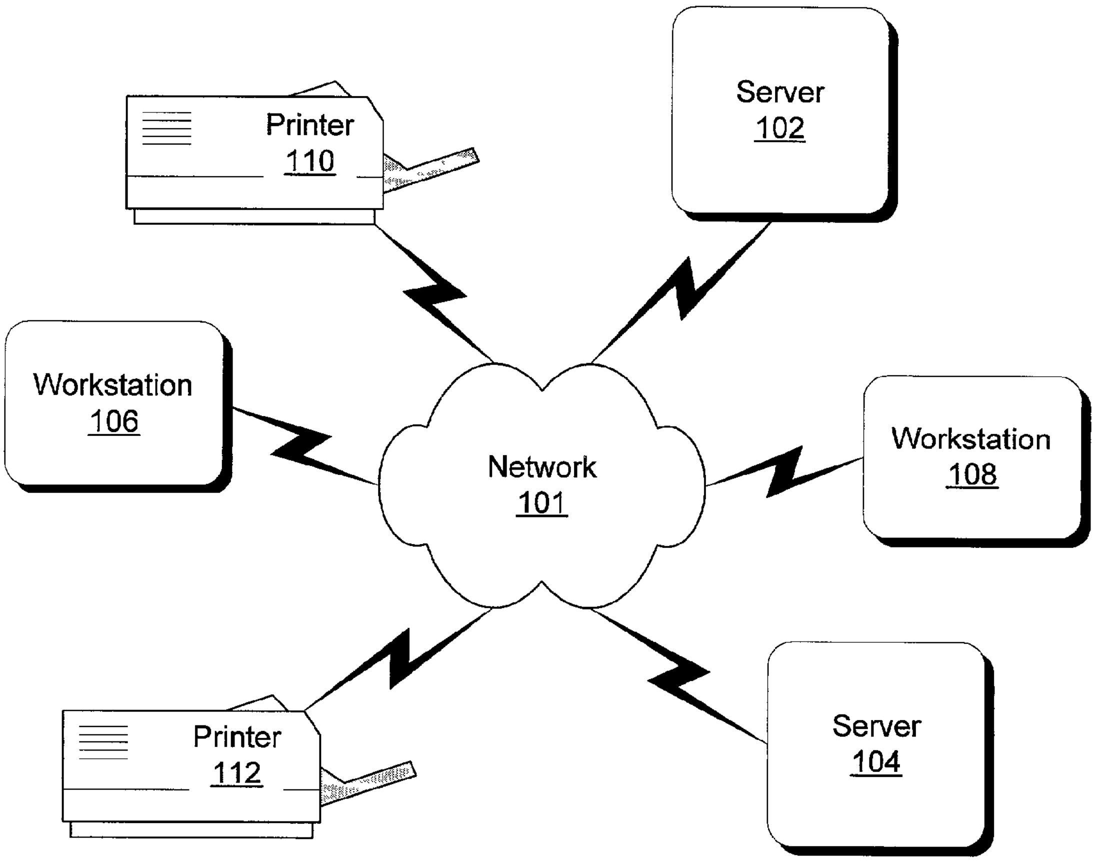
FIG. 1 is an illustration of an exemplary network environment in which multiple servers, workstations, and printers are coupled to one another via a data communication network.

The present invention comprises methods and apparatus for adjusting print and finish parameters to improve image quality in a printing system having both a printer apparatus and a finishing system. Exemplary embodiments of the invention include a large format printer that has the capability of having fully integrated into its mechanism design, or as an added on accessory, any "in-line finishing system". This finishing system comprises a fusing device that, through the use of heat and/or pressure, applies a surface finishing material to a thermal inkjet image printed onto a substrate. The finishing system also comprises a "smart cartridge" that carries and presents the finishing material between the fuser and the imaged substrate. This smart cartridge also, through the use of communications between the printer and fusing mechanism and code internal to itself, controls the processing parameters that are specific to the ink material and printed ink volume, substrate material and its physical characteristics, printing speed, environmental conditions and finishing material type. These process parameters are, by way of example but not limited to, fusing temperature, substrate feed rate, nip pressure, and nip gap. The exemplary system operates as follows:

1. In the exemplary embodiment, an in-line finishing accessory is physically and electronically integrated into the printer such that the imaged substrate feeding path of both devices jointly feed, but possibly at different rates, the imaged substrate through their respective work areas.
2. The exemplary printer determines, through a sensor or through manual intervention in combination with internal coding, the substrate (media) that is being imaged and its physical characteristics.
3. The exemplary printer determines which print mode and ink (dye or pigment) that is going to be used to image the substrate and at what print speed the imaging will be done.
4 The exemplary printer determines through customer input, either manually or through software, whether or not the imaged substrate is to be "finished".
5. The exemplary printer also through internal sensors and firmware determines the environmental conditions.
6. The exemplary printer then passes this information onto the smart dispenser along with a signal noting the print status (amount printed, amount not printed, printing or not printing, error state, etc).
7. With this information and information in the smart dispenser the exemplary smart dispenser determines what finishing material it is presenting to the fusing mechanism as well as what process parameters such as (for example) finishing temperature, finishing speed, nip, gap size, and pressure should be used to finish the imaged substrate.

8. The exemplary smart dispenser then passes this information onto the controller to drive the fusing mechanism in a way to assure the completion of a customer acceptable finished product, imaged and finished.
9. In a further refinement of this exemplary design, the smart dispenser communicates to the printer what finishing material will be used. With this information the printer can select the correct printmode to assure that a high image quality will be achieved with that combination of substrate, ink and finishing material characteristics.

DETAILED DESCRIPTION

FIG. 1 illustrates a network environment in which multiple servers, workstations, and printers are coupled to one another via a data communication network 101. The network 101 couples together servers 102 and 104, computer workstations 106 and 108, and printers 110 and 112. Network 101 can be any type of network, such as a local area network (LAN) or a wide area network (WAN), using any type of network topology and any network communication protocol. In a particular embodiment, network 101 is the Internet. Although only a few devices are shown coupled to network 101, a typical network may include tens or hundreds of devices coupled to one another. Furthermore, network 101 may be coupled to one or more other networks, thereby providing coupling between a greater number of devices.

Servers 102 and 104 may be file servers, email servers, database servers, print servers, or any other type of network server. Workstations 106 and 108 can be any type of computing device, such as a personal computer. Particular embodiments of the invention illustrate printers 110 and 112 as laser printers. However, alternative embodiments of the invention are implemented with inkjet, bubble-jet or any other type of printer. Furthermore, the teachings of the present invention may be applied to any type of printing device, such as copiers and fax machines. Although not shown in FIG. 1, one or more workstations and/or servers may contain a print rendering engine capable of converting raw print job information into a particular format (e.g., language) understood by certain types of printers. A printer menu editor application is optionally executed on workstation 106 or 108, or on server 102 or 104, to create or modify a printer menu structure. After the printer menu structure has been completed, the menu is "installed" by communicating the menu data across network 1 to one or more printers, such as printer 110 or 112.

Figure 2:
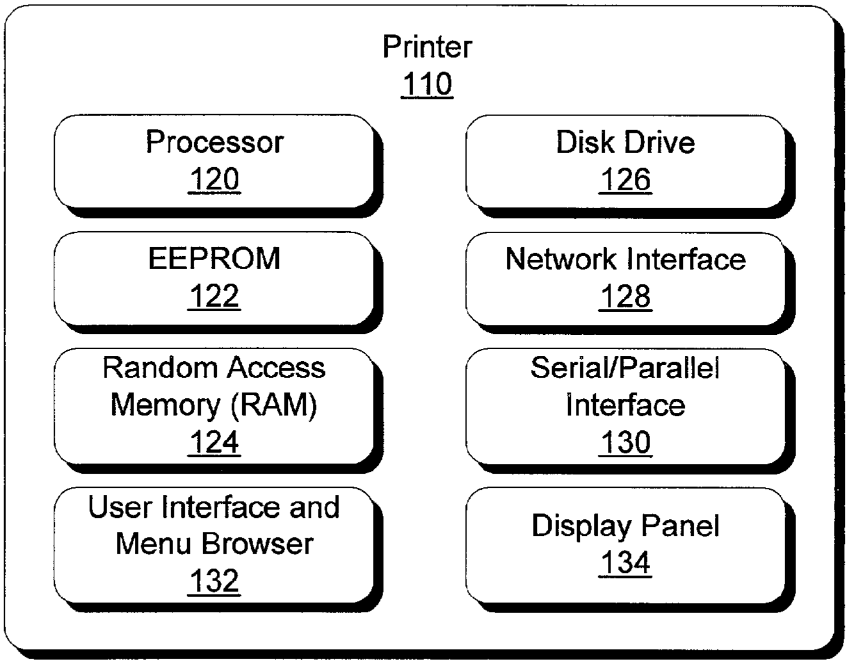
FIG. 2 is a block diagram showing pertinent components of an exemplary printer suitable for use with various systems and/or methods described herein.

FIG. 2 is a block diagram showing pertinent components of printer 110 suitable for use with various examples presented herein. Printer 110 includes a processor 120, an electrically erasable programmable read-only memory (EEPROM) 122, and a random access memory (RAM)124. Processor 120 processes various instructions necessary to operate the printer 110 and communicate with other devices. EEPROM 122 and RAM 124 store various information such as configuration information, fonts, templates, data being printed, and menu structure information. Although not shown in FIG. 2, a particular printer may also contain a ROM (non-erasable) in place of or in addition to EEPROM 122.

Printer 110 also includes a disk drive 126, a network interface 128, and a serial/parallel interface 130. Disk drive 126 provides additional storage for data being printed or other information used by the printer 110. Although both RAM 124 and disk drive 126 are illustrated in FIG. 2, a particular printer may contain either RAM 124 or disk drive 126, depending on the storage needs of the printer. For example, an inexpensive printer may contain a small amount of RAM 124 and no disk drive 126, thereby reducing the manufacturing cost of the printer. Network interface 128 provides a connection between printer 110 and a data communication network, such as network 101. Network interface 128 allows devices coupled to a common data communication network to send print jobs, menu data, and other information to printer 110 via the network. Similarly, serial/parallel interface 130 provides a data communication path directly between printer 110 and another device, such as a workstation, server, or other computing device. Although the printer 110 shown in FIG. 2 has two interfaces (network interface 128 and serial/parallel interface 130), a particular printer may only contain one interface.

As shown in FIG. 2, exemplary printer 110 also contains a user interface/menu browser 132 and a display panel 134. User interface 132 may be a series of buttons, switches or other indicators that are manipulated by the user of the printer. Display panel 134 is a graphical display that provides information regarding the status of the printer and the current options available through the menu structure. The printer 110 display panel 134 displays various menu options to the user of the printer. The display panel and associated control buttons allow the user of the printer to navigate the printer's menu structure.

Figure 3:
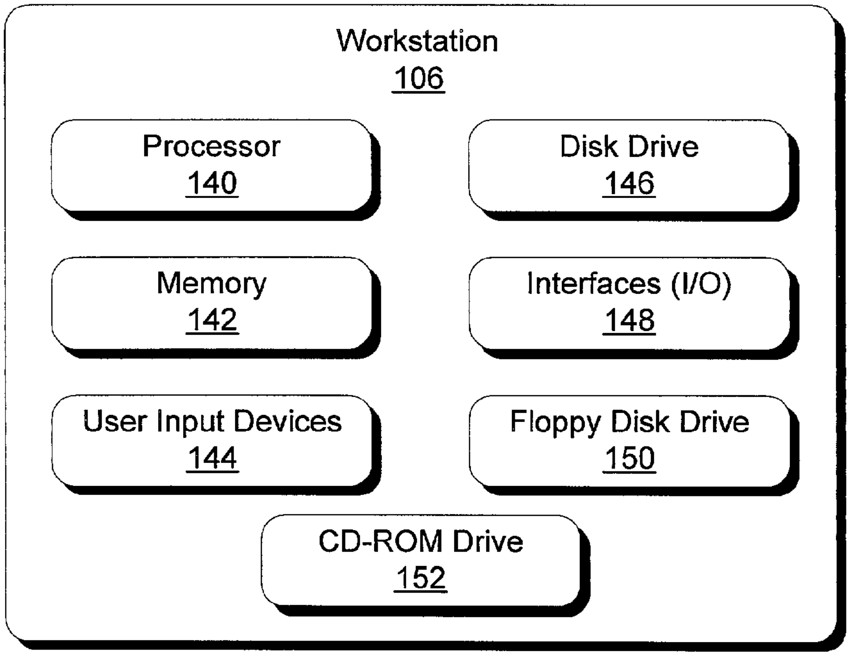
FIG. 3 is a block diagram showing pertinent components of an exemplary computer workstation suitable for use with various systems and/or methods described herein.

FIG. 3 is a block diagram showing pertinent components of a computer workstation 106 in accordance with the invention. Workstation 106 includes a processor 140, a memory 142 (such as ROM and RAM), user input devices 144, a disk drive 146, interfaces 148 for inputting and outputting data, a floppy disk drive 150, and a CD-ROM drive 152. Processor 140 performs various instructions to control the operation of workstation 106. Memory 142, disk drive 146, and floppy disk drive 150, and CD-ROM drive 152 provide data storage mechanisms. User input devices 144 include a keyboard, mouse, pointing device, or other mechanism for inputting information to workstation 106. Interfaces 148 provide a mechanism for workstation 106 to communicate with other devices.

Substrates, Inks and Finishing Materials Suitable

Substrates include, but are not limited to, paper, plastic, wood, textiles, metal, foil, etc. In general, substrates can be classified into three categories: paper/paperboard (e.g., kraft linerboard, clay coated kraft, solid bleached sulfate, recycled paperboard, coated paper, uncoated freesheet paper, etc.); polymer films (e.g., polyethylene, polypropylene, polyvinyl chloride, etc.); and multilayer/laminations (e.g., metallized papers, metallized film, polyethylene coated SBS, etc.).

Substrate characteristics include, but are not limited to, texture, absorbency, gloss, caliper, etc. Smoother substrates allow for higher resolution printing while rough, irregular surfaces such as newsprint and corrugated liner board require a lesser resolution. Defects in smoothness include macro and micro defects. Macro refers to irregularities visible to a naked eye and micro refers to a very small area with defects not readily seen with a naked eye. With reference to the three aforementioned substrate categories, paper newsprint, corrugated linerboard, and paperboard are relatively rough while calendered and coated papers are the smoothest. Regarding polymer films, polymer films are typically the smoothest printing surfaces; however, ink adhesion may be an issue. For multilayered/laminations, smoothness is normally dependent on the substrate used as a printing surface.

On substrates with little or no absorption characteristics, ink dries at the surface. Papers with low absorption rates are sometimes referred to as having high "hold-out", i.e., the paper holds or prevents ink from being absorbed into the sheet. In general, corrugated, newsprint, and paperboard are very absorbent while calendered and coated papers are less absorbent and exhibit high ink hold-out. Polymer films are generally non-absorbent and exhibit a high degree of ink hold-out. Absorption characteristics of multilayered/laminations depend on the substrate used as a printing surface.

Gloss is another substrate characteristic. Coated papers and films have gloss characteristics that influence the gloss of applied inks. High gloss finishes are very shiny and tend to be reflective. Matte or low-gloss finishes can be applied to all substrates; uncoated and uncalendered papers have low gloss. In general, calendered and coated papers have high gloss qualities while corrugated linerboard, uncalendered newsprint, and paperboard have low-gloss qualities. Gloss can be increased after printing by finishing (e.g., applying an overprint varnish or lamination). Polymer films typically have higher gloss than the highest gloss papers. Films can also be produced with a matte finish. The gloss of the printing surface of a multilayered/laminations substrate depends on the substrate used as a printing surface. Again, an increase in gloss is achievable through finishing after printing,e.g., by applying an overprint varnish or lamination.

Another important substrate characteristic is caliper—the thickness of a substrate. Paper caliper can range from thin to thick, while polymer film caliper tends to be thin. In general, thin films require printing conditions with very accurate tension controls. For all substrates, caliper uniformity is an important characteristic, especially if a printing process cannot adjust for variations in caliper.

Ink formulations differ depending upon printing process and application. Examples discussed herein include inkjet ink and laser ink, also known as toner. Inkjet printers and laser printers are known in the art of digital printing. Nearly every printing ink is formulated from three basic components: colorant (pigment or dye); vehicle; and additives. Colorants are the visible portion of the ink and are more often pigments rather than dyes. Important characteristics of colorants include specific gravity, particle size, opacity, chemical resistance, wettability, and permanence. Vehicles include oils (petroleum or vegetable), solvents, resins, water, etc. A vehicle is largely responsible for ink rheology (e.g., body, viscosity, or other flow properties). It is a primary factor in transfer, tack, adhesion, lay, drying and gloss. Additives include silicone, wetting agents, waxes, driers and other materials used to enhance performance characteristics such as drying speed, color development, etc.

Inks dry by absorption, oxidation/polymerization, evaporation, solidification, precipitation, etc. Sometimes a printing process evaporates solvent in ink through exposure to heated rollers or dryers. If ink needs to be chilled after going through a set of heat rollers the process of drying is called solidification. Precipitation of resin from ink vehicle may also occur. Inkjet ink typically includes water-soluble dyes, polyethylene glycol, diethylene glycol, N-methyl pyrrolidone, biocide, buffering agent, polyvinyl alcohol, tri-ethanolamine, and distilled water. The use of water-soluble dyes often leads to poor water fastness on paper. However, ink formulas for inkjet printers that have suitable water fastness are known in the art. Another issue in inkjet printing is wicking (i.e., ink spreading away from dots along fibers). Hot melt/phase change inks generally lessen wicking concerns.

Figure 4:
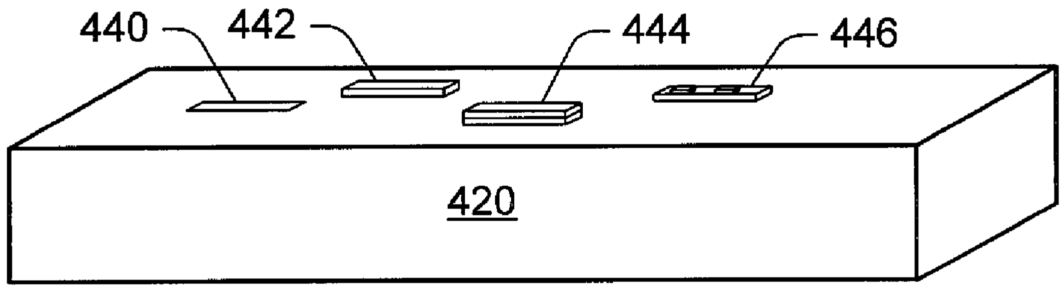
FIG. 4 is an illustration of an exemplary print including a substrate having ink deposited thereon.

In a typical laser printer, a laser beam charges a printing drum by applying a static charge to the photoreceptive drum. The areas that received the charge tend to attract "toner" particles, thereby allowing for transfer of an image to a substrate. For permanency, a toner-based image is usually heated and fused with its substrate. Two-component toner ink is commonly used and includes two components, toner and carrier (typically in the form of beads). Other less commonly used toner inks include mono-component toner ink and liquid toner ink. Toner typically has a particle size of approximately 3 μm to 30 μm, depending on the desired resolution of the printed image. A two-component toner ink may include more than two-components, for example, a carrier (e.g., styrene acrylic resin), a toner or pigment (e.g., carbon black), and a charge control material to endow the toner with desirable tribocharging properties. Mono-component toner inks differ from two-component toner inks in that they do not require the use of carrier for development. FIG. 4 shows a print 410 including a substrate 420 and ink 440, 442, 444, 446 deposited thereon. Ink deposit 440 has no substantial thickness and is approximately level with the top surface of the substrate 420. Ink deposit 442 has a significant thickness, as do ink deposits 444 and 446. Ink deposit 444 has a plurality of ink layers, which are approximately coincident, i.e., on top of each other. Ink deposit 446 has a plurality of ink layers, some of which have a smaller area than others. Issues related to finishing may arise due to differences in ink deposits.

Finishing materials include, but are not limited to, laminates and transfer overcoats. Finishing materials are supplied as sheets, rolls, and the like. As discussed herein, laminates are applied via a lamination process and transfer overcoats are applied via a coating process, both of which are considered finishing processes. Such finishing processes typically use at least one roller and/or a press; however, processes using a vacuum and/or an electrostatic procedure are also within the scope of finishing processes discussed herein.

A finishing material can significantly improve a print's characteristics, such as a print's resistance to environmental conditions. Selection of an appropriate finishing material depends on a variety of factors, such as ink, substrate, print processing and/or print use,e.g., indoors or outdoors, lighting conditions, etc. A finishing material may be used to encapsulate a print by completely sealing the print with both an over and an under finishing material.

Certain finishing materials are available in a variety of surfaces, including matte, textured, luster, and glossy. A finishing material can also alter a print's surface, for example, impart a glossy surface to a matte print. In turn, a glossy surface can effectively deepen a print's dark colors and increase color saturation. Finishing materials may also improve and/or alter smear resistance, scratch resistance, water resistance, resistance to finger prints or other animal/plant substances, and/or chemical resistance.

A laminate typically has a thickness of approximately 35 μm to 125 μm or more. A laminate can add stiffness and weight to a print. Of course, end use of a print should dictate the degree of additional rigidity needed. Laminates include cold, heat-assisted and hot laminates. Cold laminates typically include polyester and/or vinyl films and adhesives, which may be temporary, permanent and/or repositionable. Cold laminates are suitable for prints that cannot withstand heat. Heat-assisted laminates are usually applied with a combination of pressure and heat. Hot laminates require application of heat and/or pressure. Process conditions for hot laminates include time, temperature, pressure, tension, etc.

Some laminates include a film having a thermal polymer coating wherein passing the film across a heated roller causes the polymer to develop adhesive qualities, usually in association with a phase transition, which occurs at a specific temperature and/or over a temperature range. When applied to a print, the laminate can impart a clear matt or gloss finish, depending on laminate characteristics. Process conditions for all laminates may depend heavily on a print's ink, substrate and/or printing conditions A transfer overcoat finishing material, as the name implies, is transferred to a print (e.g., a substrate having ink deposited thereon) using a transfer process. A typical transfer process relies on application of heat to a multi-layer complex, which includes a carrier layer and a transfer overcoat layer and optionally a release layer and/or an adhesive layer. Application of heat to the complex causes release of the transfer overcoat layer from the carrier layer thereby allowing the transfer overcoat layer to transfer and coat a print. A separate release layer positioned between a carrier layer and a transfer overcoat layer may facilitate release of the transfer overcoat layer from the carrier layer. An adhesive layer may facilitate adhesion of a transfer overcoat layer to a print. A carrier layer may have a thickness of approximately 5 μm to approximately 10 μm and a transfer overcoat layer may have a thickness of approximately 3 μm to approximately 10 μm. Forms of transfer overcoat include, but are not limited to, transfer ribbon (e.g., barcode, receipt, labels, etc.), stamp foil (e.g., packaging, decorations, monograms), and printing foil or transfer printing.

Printing and Finishing Process Parameters Information regarding a print includes, but is not limited to, substrate parameters, ink parameters and/or printing parameters. Information regarding a finishing process includes, but is not limited to, finishing material parameters and/or finishing process parameters. Processes for forming a print by depositing ink onto a substrate rely on a variety of process parameters. A user may input parameters to a printer prior to and/or during printing. Alternatively, or in addition to, a printer may monitor and/or adjust parameters prior to and/or during printing. While some parameters are germane to all printing processes, some parameters are germane to laser printing (e.g., printers using toner inks) and others are germane to inkjet printing.

All laser printers include a process for depositing ink onto a substrate, which may depend on the type of toner ink. For example, there are three major ways of depositing a two-component ink onto a substrate, the most common of these being cascade deposition. The cascade deposition process relies on triboelectrification, which is a process of exciting toner particles by causing an electrical charge (static) through the use of friction. The process causes excited particles to cling to read carriers.

Several processes exist for depositing mono-component toner ink onto a substrate. These processes include induction, contacting, corona charging, ion beam, traveling electric field, etc. The most commonly used of these is induction charging. Through induction charging, a conducting particle sitting on a negative surface becomes negatively charged. Because the opposite charges repel each other, the negatively charged particle is repelled by the negative plate and drawn to the positive plate. Through this process, particles lose their negative charges and become positively charged. Once toner particles become charged, they are transferable to a substrate.

Whether a toner comprises one or more components, a process known as fusing typically follows the process of toner transfer to a substrate. For example, consider a toner composed of styrene acrylic resin, a pigment typically carbon black, and a charge control dye to endow the toner with the desired tribocharging properties for developing a latent electrostatic image. A fusing process melts and fuses styrene acrylic thermoplastic resin transferred to a substrate onto the substrate. A typical fusing system in a n electrophotographic printer (or copier) includes heated platen rollers. A substrate, having toner thereon, passes between the rollers to apply heat and/or pressure to the toner to melt and fuse the toner to the substrate. Such a system typically heats a roller through use of a high power tungsten filament quartz lamp resident inside at least one platen roller.

Laser printers typically include a controller that uses control software to monitor and/or adjust parameters germane to printing. For example, to maintain a certain print quality, a laser printer may use a controller to automatically monitor substrate characteristics such as caliper and adjust printing accordingly. In particular, a laser printer may use a controller to monitor substrate caliper and to adjust parameters related to delivery or application of heat energy during fusing on the basis of a monitored substrate caliper. The delivery of heat energy during fusing depends on parameters such as temperature, pressure, feed rate, etc. Thus, according to this example, the printer includes a controller having an input for substrate caliper and an output for temperature, pressure, feed rate, etc., wherein the output is a function of the input.

A laser printer's fusing process should also account for type of substrate and/or ink. Certain plastic substrates, such as overhead transparencies, require increased heat delivery when compared to normal paper substrates. However, to avoid warping a plastic substrate, a process should adjust parameters related to heat delivery to avoid exceeding the plastic's glass point or phase change point. For example, a printer controller may specify a maximum fusing temperature based on type of substrate. Another issue arises for duplex prints, wherein ink is deposited onto a first side and a second side of a substrate. This issue involves applying sufficient heat to fuse the second side to a proper standard without over heating the first side.

In general, inkjet printers perform no process equivalent to fusing. As described above, inkjet ink typically includes water-soluble dyes and a variety of mainly hydrophilic components. Thus, issues in inkjet printing related to ink deposition include water fastness and wicking on substrates. In an inkjet printing process, an inkjet substrate should capture an image (as transferred by drops of ink from a printhead) without degradation of the image. One approach involves a substrate having additives (e.g., layers of organic and/or inorganic polymers). Polymer properties can help control the ink when it first contacts a substrate, thus reducing problems such as one ink "bleeding" into another, or loss of density due to ink penetrating a substrate too deeply. Ink and substrate may also be selected and/or controlled to allow for immediate handling of a print without smearing or smudging. Proper ink management through printing processes and/or choice of ink and/or substrate can also avoid wrinkling (cockle) of a substrate. Polymeric components in a substrate may also interact with ink to make a print last longer, resist dampness, humidity, and/or fading.

Inkjet printers typically include a controller that uses control software to monitor and/or adjust parameters germane to printing. For instance, if a printhead nozzle fails, a controller can compensate so that the failure does not unnoticeably affect print quality. Similarly, control algorithms for image analysis and/or deconvolution can help a controller determine an efficient printing mode that maximizes throughput. Control software can also adjust printing color and tone and/or positioning of ink droplets on a receiving substrate, which may account for physical and chemical interactions with a substrate. Regarding droplet delivery, an ink drop spreads into or onto a substrate depending due to wetting, absorption, diffusion, penetration, swelling, evaporation, and/or other mechanisms. A controller may account for such phenomena.

In finishing processes that apply a laminate or a transfer overcoat to a print, parameters often include feed rate, dwell time, applied heat, temperature (e.g., of heated rollers, print and/or finishing material), pressure (e.g., force being to bond materials), tension of the materials, nip gap, nip area, etc.

A finishing material and/or a finishing process may interact beneficially and/or detrimentally with a print. For example, in some instances, a finishing material can reduce the density range of a print resulting in a print that has less shadow detail. A finishing material can also add significant weight and thickness to the print. Importantly, a finishing material should make suitable optical contact with a print, which includes suitable contact with both ink deposited portions and non-ink deposited ("bare" substrate) portions.

Optical contact may be compromised by ink (including toner) voids (e.g., interior portions of a numeral "8", multiple ink layers, etc.) wherein a finishing material does not contact all layers ink and/or substrate. Contact voids typically cause light to reflect from some surfaces and preclude light from passing through to other substrate and/or ink surfaces. In other words, voids between a finishing material and a print cause light to scatter and reflected back without passing through to portions of a print. Thus, loss of image contrast can result when light is scattered from a finishing material and thus precluded from reaching the underlying print.

Finishing processes normally use a drum or cylinder. For example, some finishing devices use a cylinder having a ceramic coating heated by electrical resistance, which can achieve a very stable heat band. A stable heat band exhibits little temperature fluctuation and no significant hot spots.

Figure 5:
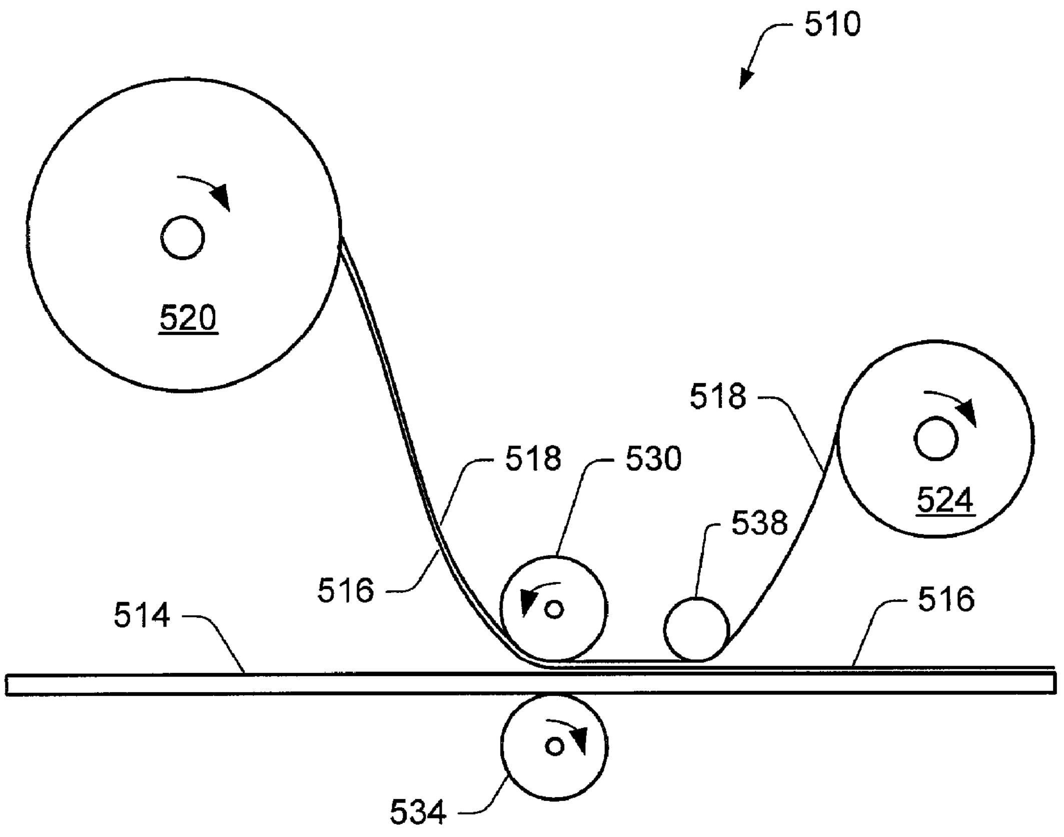
FIG. 5 is an illustration of various components of an exemplary finishing device for transferring a finishing material to a print.

FIG. 5 illustrates an exemplary finishing process 510. In this exemplary process, a roll 520 supplies a finishing material having a carrier layer 518 and a transfer layer 516. The finishing material optionally includes a release layer positioned between the transfer layer 516 and the carrier layer 518 and/or an adhesive layer (chemical and/or electrical) on the transfer layer 516 for adhering the transfer layer 516 to the print 514. As shown in FIG. 5, a print 514 contacts the transfer layer 516 at a nip point, defined by an upper nip roller 530 and a lower nip roller 534 through which the print 514, the transfer layer 516, and the carrier layer 518 pass. The carrier layer 518 separates from the transfer layer 516 at or near a separator bar 538 (or roller). At the separator bar 538, the carrier layer 518 proceeds to an uptake roll 524 and the transfer layer 516 remains in contact with the print 514. A finishing device including a controller may control finishing process parameters such as, but not limited to, feed rate (e.g., print and/or finishing material), pressure, nip gap, heat flux, and/or temperature.

Often, a goal of finishing is to perform a finishing process predictably and reliably to allow other tasks, such as printing, to be carried out without concern. As described herein, to achieve this goal, information germane to printing is used to perform finishing in a reliable and predictable manner.

Controller for Finishing and/or Printing

An exemplary controller for controlling finishing and/or printing monitors and/or receives input parameters and adjusts output parameters as a function of the input parameters. Such an exemplary controller optionally includes a conventional feedback control structure (e.g., classic proportional integral, PI, etc.) and/or an adaptive control structure.

Figure 6:
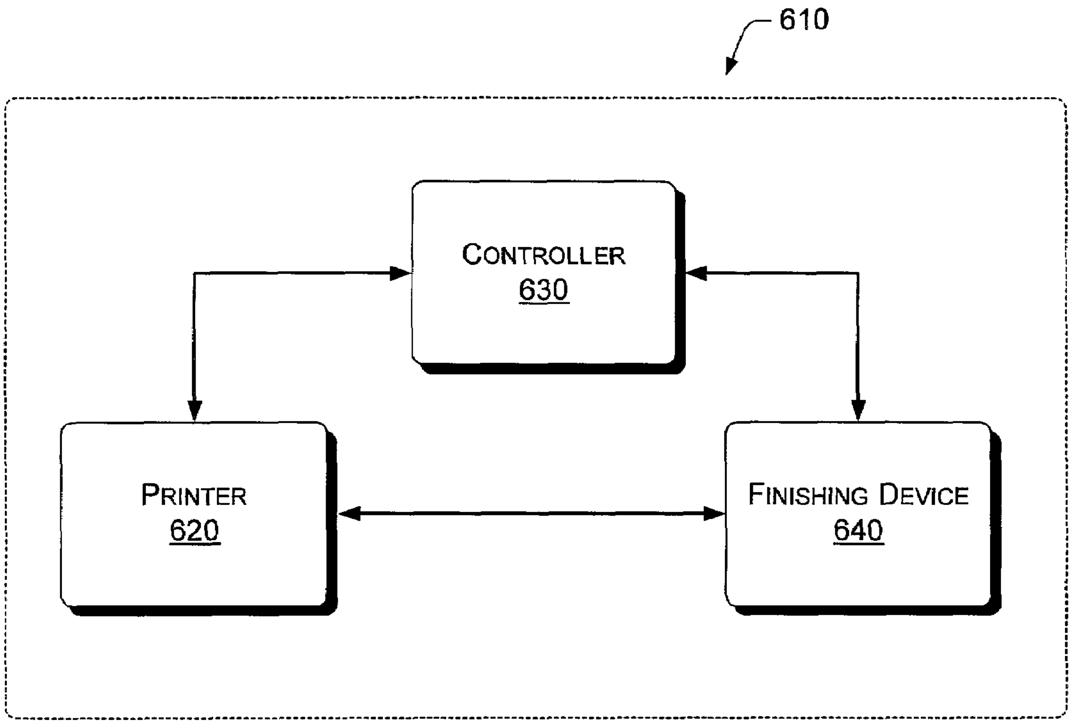
FIG. 6 is an illustration of an exemplary system having a printer, a finishing device and a controller.

Referring to FIG. 6, an exemplary printing and finishing system 610 includes a printer 620, a controller 630 and a finishing device 640. This exemplary printing and finishing system 610 is optionally incorporated within a printing and finishing unit. According to the system 610, the printer 620 may optionally include a controller (or the controller 630) and/or the finishing device 640 may optionally include a controller (or the controller 630). As shown in FIG. 6, at least one communication channel exists between the printer 620, the controller 630, and the finishing device 640. Through such a communication channel, the controller 630 monitors and/or receives at least one input parameter, for example, at least one parameter selected from the parameters presented in Tables 1 and 2. The exemplary controller 630 then outputs an output parameter that beneficially enhances performance of the printer and/or finishing device to produce a print having a finishing material deposited thereon.

TABLE 1

Exemplary substrate, ink and finishing material parameters

| Substrate | Ink | Finishing Material |
|---|---|---|
| Composition | colorant | composition |
| Caliper | vehicle | caliper |
| critical surface tension | additives | UV character |
| Texture | surface tension | Transition temperature |
| Absorbency | rheology | texture |
| Gloss | carrier | gloss |

TABLE 2

Exemplary printing and finishing parameters

| Printing | Finishing |
|---|---|
| deposition rate | transferring |
| feed rate | feed rate |
| temperature | temperature |
| humidity | humidity |
| pressure | pressure |
| energy input | energy input |
| nip gap | nip gap |
| drying time | dwell time |
| fusing time | |

Figure 7:
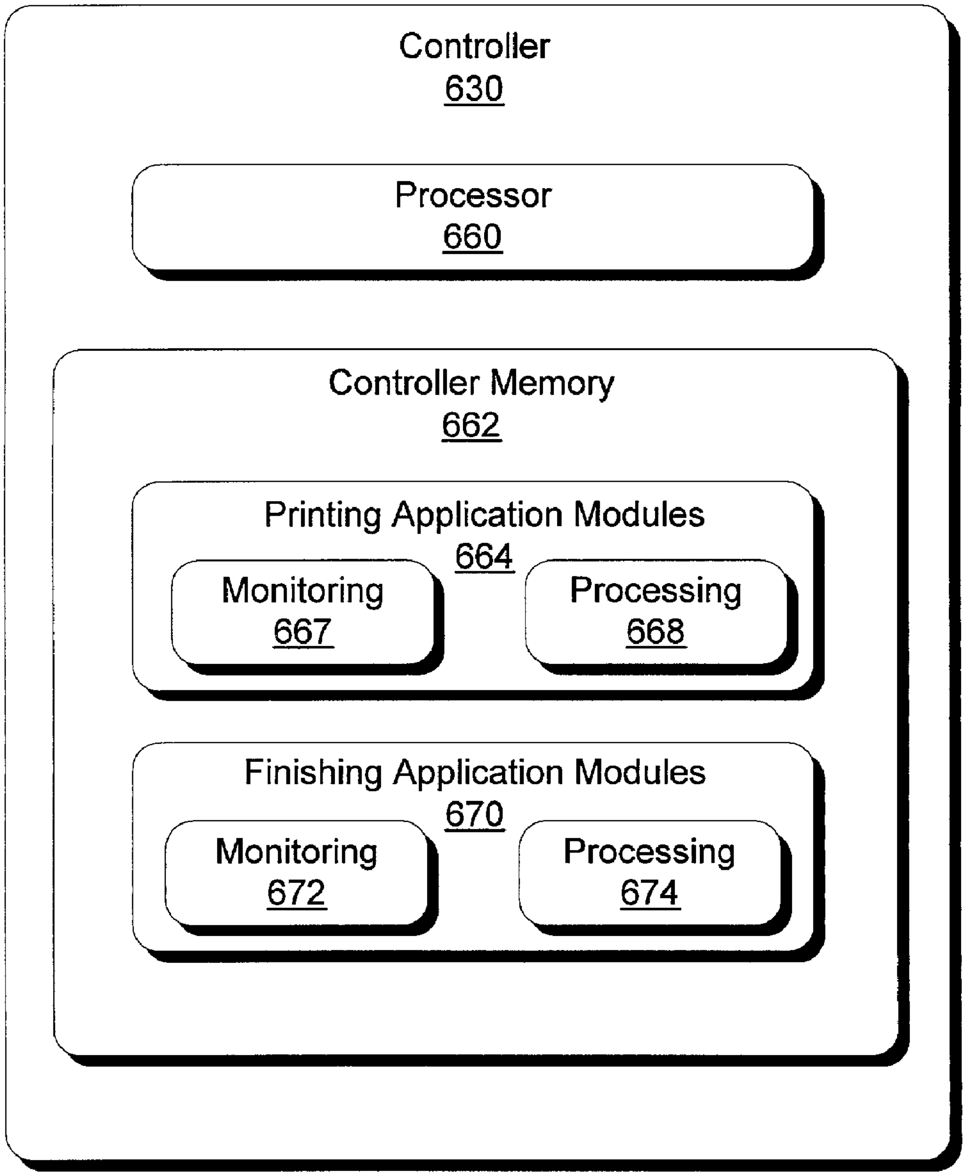
FIG. 7 is an illustration of various features of the exemplary controller shown in FIG. 6.

FIG. 7 illustrates features of the exemplary controller 630 shown in FIG. 6. The controller 630 includes a processor 660 and controller memory 662. Resident in controller memory 662 are various application modules such as, but not limited to, printing application modules 664 and finishing application modules 670. For example, as shown in FIG. 7, the printing application modules 664 include a monitoring module 667 and a processing module 668. The finishing application modules 670 also include a monitoring module 672 and a processing module 674. The printing monitoring module 667 and the finishing monitoring module 672 include software for executing algorithms related to monitoring parameters. The printing processing module 668 and the finishing processing module 674 include software for executing algorithms related to processing parameters. The monitoring and/or processing modules (664, 670)optionally share information regarding various parameters. The processor 660 optionally executes instructions supplied by application modules (e.g., 664, 670) resident in the controller memory 662 and/or supplied by an external source, such as, but not limited to, a user or a network.

Exemplary Printing and Finishing Device

Figure 8:
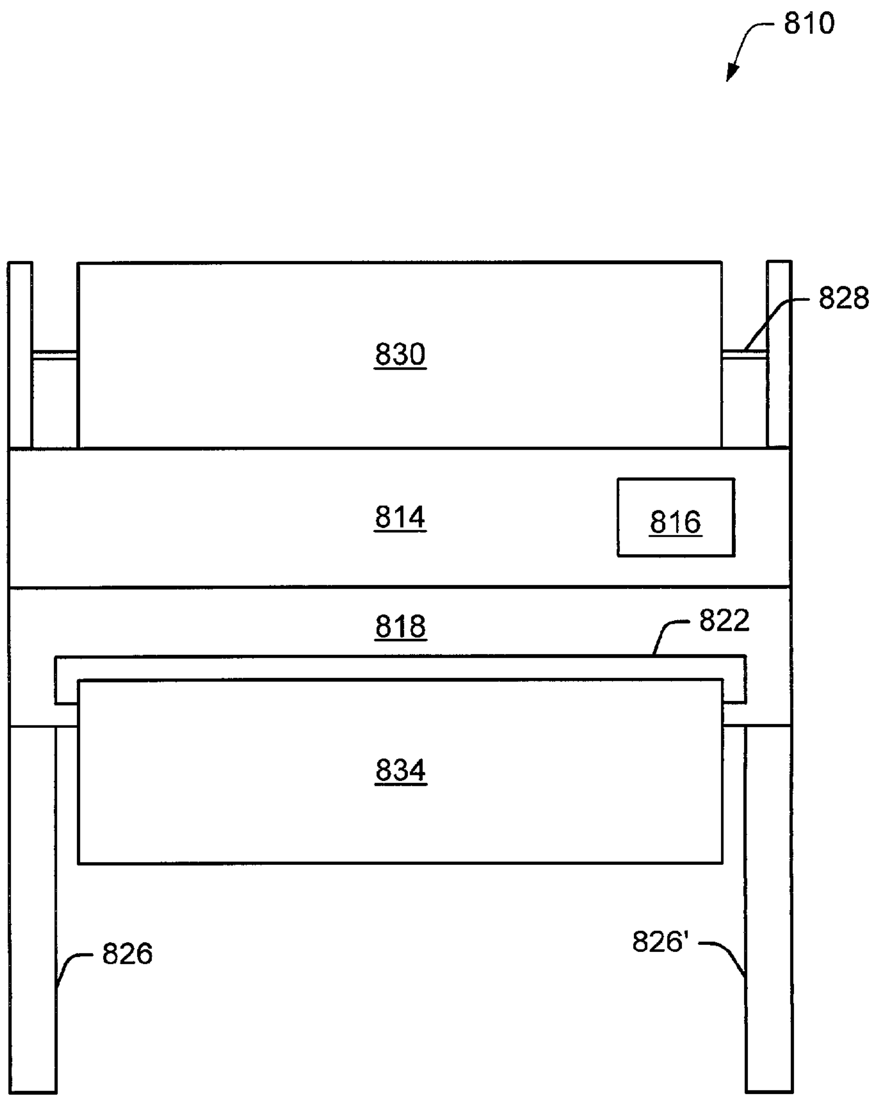
FIG. 8 is an illustration of a front view of an exemplary printing and finishing device.

FIG. 8 shows a front view of an exemplary printing and finishing device 810 for producing a print 834 optionally having a finishing material deposited thereon. The printing and finishing device 810 includes an inkjet printer section 814, a finishing section 818, and supports 826, 826. The device 810 also includes a controller 816 for controlling printing and/or finishing. The controller 816 optionally includes features such as those associated with controller 830 (see FIGS. 6 and 7). The device 810 optionally receives information from a network (wire or wireless), a transportable digital medium (e.g., a CD, a magnetic disk, etc.), and/or a photographic instrument (e.g., a motion and/or still camera). As shown in FIG. 8, the device 810 receives a substrate 830, deposits ink onto the substrate 830 in a printing section 814 to form a print 834, and outputs the print 834 from an opening 822. As shown, the substrate 830 is supplied on a roll supported by a spindle 828 (see also FIG. 9). The print 834 optionally includes a finishing material deposited thereon by the finishing section 8 18. In some instances, the device 810 may determine, or a user may determine, not to deposit a finishing material on the print 834.

Figure 9:
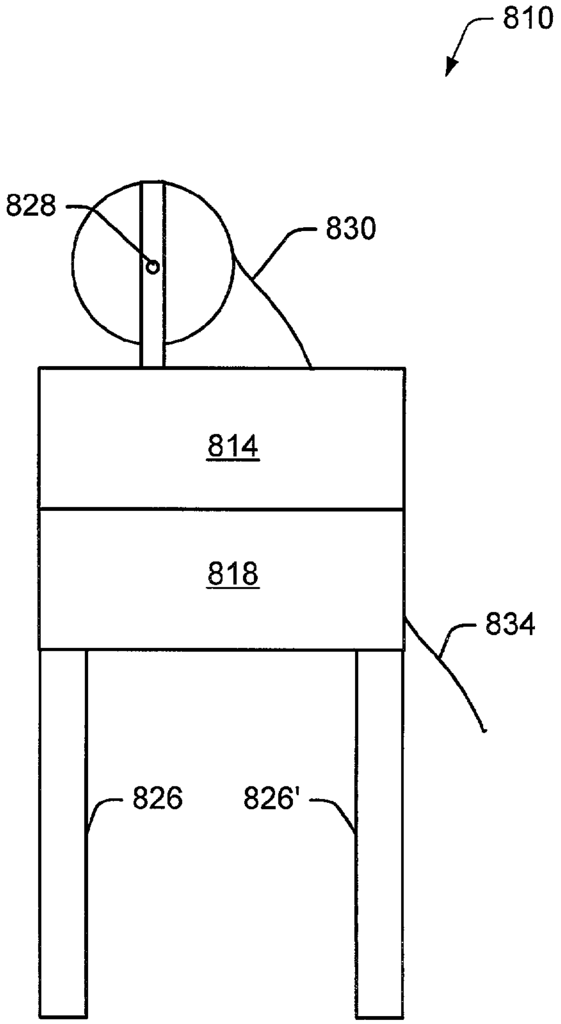
FIG. 9 is an illustration of a side view of the exemplary printing and finishing device shown in FIG. 8.

FIG. 9 illustrates a side view of the exemplary printing and finishing device 810 shown in FIG. 8. The substrate 830 is supplied on a roll supported by a spindle 828. The substrate 830 enters the printing section 814 and the passes through the finishing section 818. As shown, a print 834 optionally having a finishing material deposited thereon exits from the front side of the finishing section 818.

The printing section 814 includes a variety of features, for example, selected from one or more of those included in the DESIGNJET® 5000PS UV printing system (Hewlett-Packard, Palo Alto, Calif.) and/or other inkjet printers known in the art. The DESIGNJET® 5000PS is a large-format printer having POSTSCRIPT® (Adobe Systems, Inc., Palo Alto, Calif.) and other capabilities. This printer includes a printer support/stand, a take-up reel, spindles, a power cord, ink cartridges, printheads, a substrate roll, a POSTSCRIPT® driver, an AutoCAD driver, a WINDOWS® OS driver, a macro-installer CD, other miscellaneous software and a print bin.

The DESIGNJET® 5000PS printing system has production speeds of approximately 52 $m^2$/hr (560 $ft^2$/hr) at 600 dpi on coated paper and approximately 5.4 $m^2$/hr (58 $ft^{2/hr)\ at}$ 1200×600 dpi on glossy substrate. The DESIGNJET® 5000PS printing system also queuing for up to 32 A0/E-size jobs, and nesting; e.g., two images of 70 cm×100 cm (or 30 in×40 in) fit side by side. The printing system also includes memory, for example, 256 MB and a plurality of print cartridges,e.g., black, cyan, magenta, yellow, light cyan, light magenta, etc.

The finishing section 818 includes features such as those illustrated in FIG. 5. In particular, the finishing section 818 includes nip rollers (see,e.g., FIG. 5, nip rollers 530, 534) for transferring heat and/or pressure to a print 834 in contact with a finishing material.

The controller 816 includes features selected from one or more of those of the controller 630 described with reference to FIGS. 6 and 7. In particular, the controller 816 monitors and/or receives input parameters and outputs output parameters based at least in part on a monitored and/or received input parameter. Such parameters include, but are not limited to, those presented in Tables 1 and 2. The monitoring of an input parameter may rely on monitoring application modules and the determination of an output parameter may rely on processing application modules, such as those described with reference to FIGS. 6 and 7.

Exemplary Printing and Finishing Process

Figure 10:
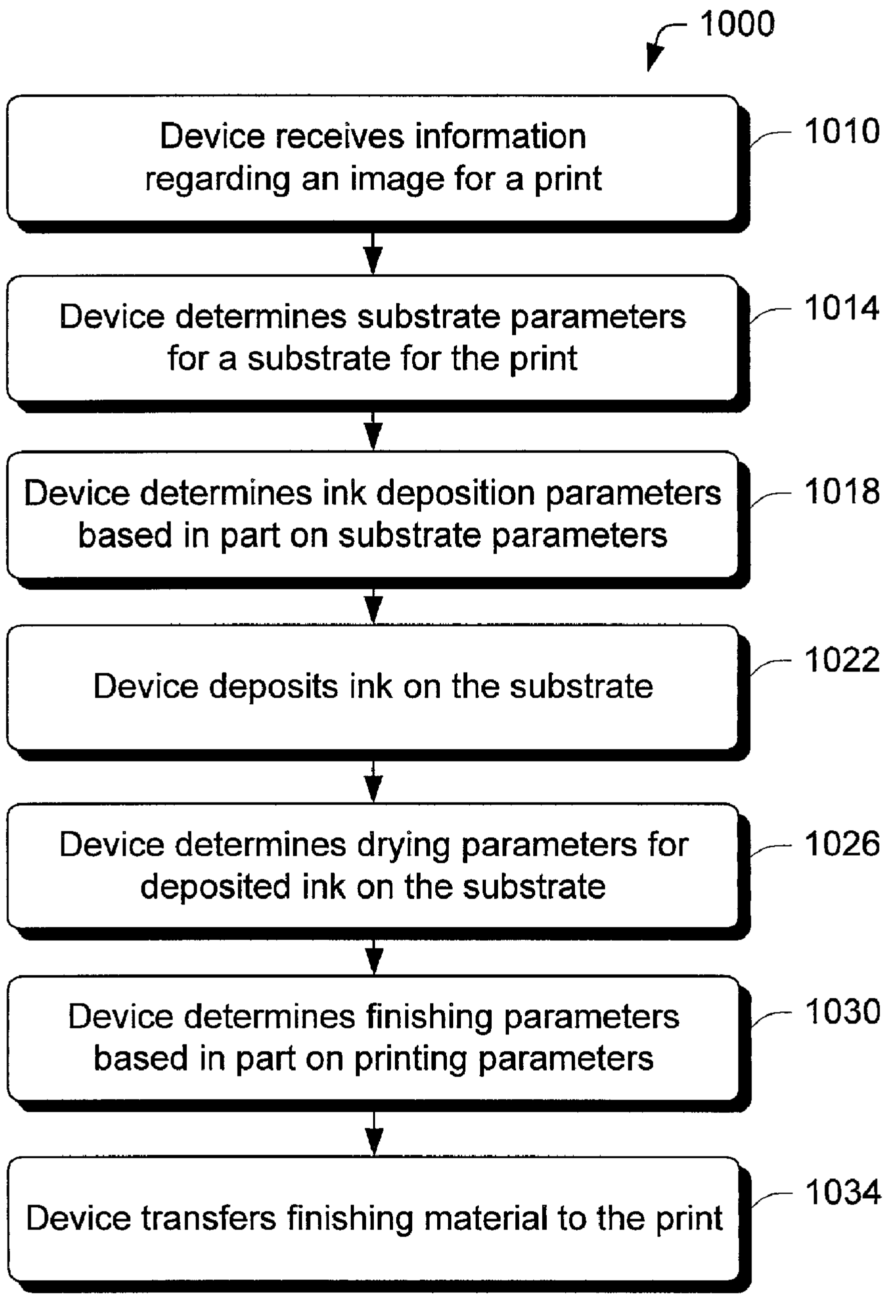
FIG. 10 is a block diagram of an exemplary printing and finishing process.

As shown in FIG. 10, an exemplary printing and finishing process 1000 is performed, for example, using the exemplary printing and finishing device 810 described above with reference to FIGS. 8 and 9. This exemplary process 1000 includes at least one determination block 1014, 1018, 1026 for parameters primarily related to printing and at least on determination block for parameters primarily related to finishing 1030. However, as already mentioned, such a process may adjust printing and finishing process parameters cooperatively.

For example, a controller may use an a priori knowledge of a finishing material and/or a finishing process to advantageously adjust printing parameters or, alternatively, a printing section and a finishing section may communicate parameters to each other and/or have access to a shared controller to advantageously adjust printing and/or finishing parameters.

Referring to FIG. 10, in a receiving block 1010, a printing and finishing device receives information regarding an image for a print. In response to the receiving, a determination block 1014 determines substrate parameters of a substrate for the print. In this determination block 1014, the information received in the receiving block 1010 may indicate a particular substrate or alternatively, or in addition to, the determination block 1014 may monitor parameters of a substrate resident in the device and/or fed manually or automatically to the device.

In response to the receiving and/or determination block 1014, another determination block 1018 determines ink deposition parameters for the print. In this determination block 1018, the information received in the receiving block 1010 may indicate a particular ink or alternatively, or in addition to, the determination block 1014 may communicate substrate parameters to the ink deposition determination block 1018 to aid in the determination of ink deposition parameters.

After the determination of various substrate and/or ink parameters, a deposition block 1022 deposits ink on the substrate. The deposition block 1022 optionally implements a controller for controlling at least one printhead. The process 1000 may also monitor printhead operation for purposes related to printing and/or finishing. After or before the deposition block 1022, yet another determination block 1026 determines drying parameters for ink deposited on the substrate. In a finishing parameter determination block 1030, the device determines finishing parameters based at least in part on printing parameters, such as, but not limited to, ink parameters, substrate parameters, ink deposition parameters, drying parameters, print speed, etc. In particular, for a finishing process that uses nip rollers, finishing parameters optionally include temperature, feed rate, pressure and/or gap.

In a transfer block 1034, the device transfers finishing material to the print. The transfer of finishing material and finishing parameter determination may occur concurrently wherein parameters monitored during the transfer feedback to a finishing parameter determination block 1030. For example, a monitor may monitor temperature at a nip roller as the print and finishing material progress through the nip rollers. The device may, e.g., through use of a controller, adjust energy input to at least one of the nip rollers in response to the monitored temperature. Alternatively, such a controller may adjust the feed rate and/or pressure of the finishing process.

Other exemplary devices and/or methods include a controller for controlling the amount of printed material as to buffer and/or queue between a printing area and a finishing area, for example, based on a printing speed (e.g., feed rate) and/or a determined finishing speed (e.g., feed rate). Such control optionally allows a process to finish as quickly as possible without overrunning a given printing speed thereby causing a potentially detrimental tugging on print media by a finishing section.

Exemplary Smart Cartridge Device

Another exemplary device includes an in-line finishing section that is optionally attached to or separate from a printing section. In this exemplary device, the finishing section optionally includes a "smart cartridge" for housing finishing material and supplying finishing material to a print. For example, referring to FIG. 5, a smart cartridge optionally houses finishing a material roll 520 and/or an uptake roll 524. A finishing section may receive such a smart cartridge through a top loading, side loading or other loading mechanism.

According to the exemplary device including a smart cartridge, the smart cartridge includes a controller such as the controller 630, described with reference to FIGS. 6 and 7. The smart cartridge controller further includes a communication link for communication with a printer. The smart cartridge controller may monitor and/or receive parameters such as those presented in Tables 1 and 2. Through use of various application modules, the smart cartridge can output parameters relevant to printing and/or finishing processes.

Exemplary Process using a Smart Cartridge Device

Figure 11:
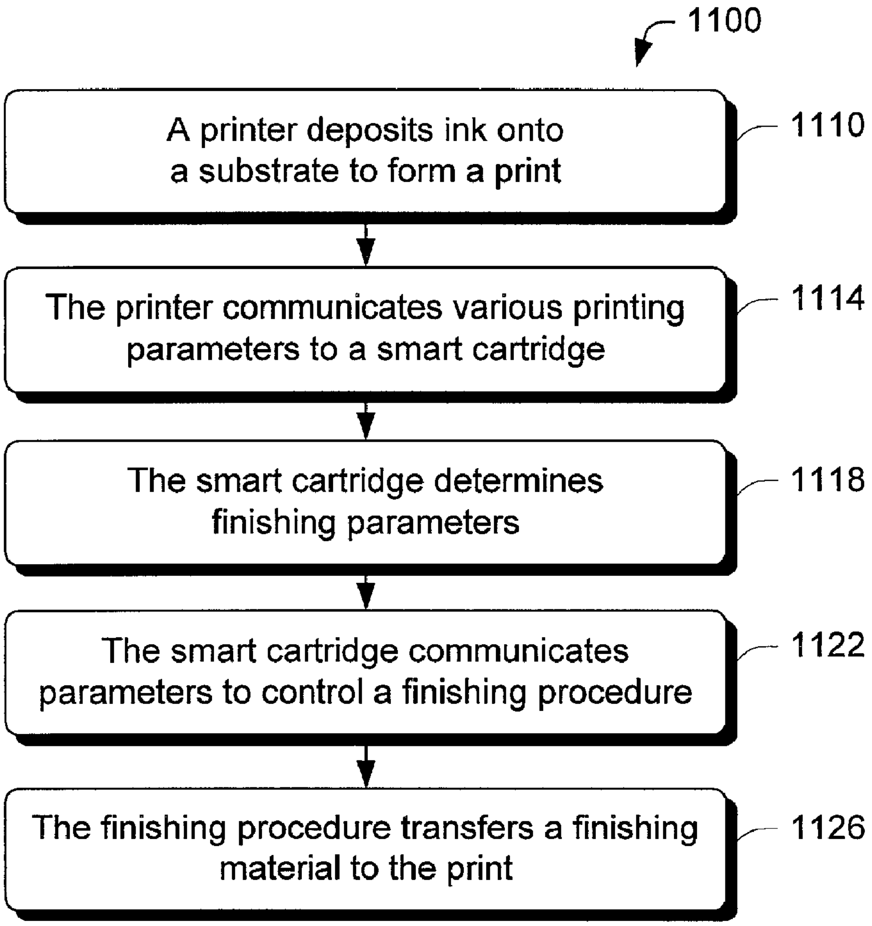
FIG. 11 is a block diagram of an exemplary printing and finishing process optionally executable on a smart cartridge.

An exemplary process 1100, shown in FIG. 11, involves a printing block 1110, wherein a printer deposits ink onto a substrate to form a print. During this ink deposition procedure, the printer monitors and/or receives various printing parameters. In a communication block 1114, the printer, through a communication link (using wire, wireless, or a storage medium), communicates various printing parameters to a smart cartridge. The printer communicates printing parameters in a raw and/or a processed form, which are processed, for example, by a processing module resident in the printer. Having received the parameters and/or other information from the printer, in a determination block 1118, the smart cartridge determines various finishing parameters. In another communication block 1122, the smart cartridge communicates various finishing parameters to effectuate control of a finishing procedure. In a finishing block 1126, a finishing section performs the finishing procedure that transfers a finishing material to the print.

Although the invention has been described in language specific to structural features and/or methodological steps, it is to be understood that the invention defined in the appended claims is not necessarily limited to the specific features or steps described. Rather, the specific features and blocks are disclosed as preferred forms of implementing the claimed invention.

The invention claimed:

1. A printing and finishing system having a printing device for producing a print according to printing parameters and a finishing device for finishing the print according to finishing parameters, the system comprising:

- a controller configured for two-way communication between the printing device and the finishing device, wherein:
  - the controller determines substrate parameters for a substrate for the print, based on a prior selection of the substrate and monitoring of parameters of substrates available to the printing device, and the controller determines ink deposition parameters that are determined in part by the substrate parameters, and the controller determines drying parameters, and the controller determines finishing parameters based in part on the substrate parameters, the ink deposition parameters and the drying parameters;
  - the controller adjusts at least one of the printing parameters in response to two-way communication that includes at least one of the finishing parameters;
  - the controller adjusts at least one of the finishing parameters in response to two-way communication that includes at least one of the printing parameters; and
  - the controller regulates a buffer of printed material between the printing device and the finishing device, wherein the buffer of printed material is queued to go to the finishing device and wherein the buffer regulation is based on a determination of speed of operation of the printing device and the finishing device:

wherein the controller operates the printing device using the at least one printing parameter adjusted in response to at least one finishing parameter and operates the finishing device using the at least one finishing parameter adjusted in response to at least one printing parameter.

2. The system of claim 1, further comprising:

a printing application module, defined in memory within the controller, comprising the printing parameters associated with the printing device, wherein the printing parameters are moved by the controller according to the two-way communication; and a finishing application module, defined in memory within the controller, comprising the finishing parameters associated with the finishing device, wherein the finishing parameters are moved by the controller according to the two-way communication.

3. The system of claim 2, wherein:

parameters are shared between the printing application module and the finishing application module; and the shared parameters are used in the adjusting of printing parameters and in the adjusting of the finishing parameters.

4. The system of claim 1, wherein operation of the printing device is directed by the controller using an algorithm adapted for use of parameters obtained by two-way communication with both the printing device and the finishing device.

5. The system of claim 4, wherein the parameters used comprise information on substrate media type, information on ink type and information on a printing process.

6. The system of claim 5, wherein information on the printing process comprises information on the ink deposition rate, temperature, humidity and drying time.

7. The system of claim 1, wherein operation of the finishing device is directed by the controller using an algorithm adapted for use of parameters obtained by two-way communication with both the printing device and the finishing device.

8. The system of claim 7, wherein the parameters used comprise information on finishing material and information on a finishing process.

9. The system of claim 8, wherein information on the finishing process comprises information on feed rate, nip gap and dwell time.

10. A printing and finishing system having a printing device for producing a print according to printing parameters and a finishing device for finishing the print according to finishing parameters, the system comprising:

a feedback control structure configured for adjusting printing parameters in response to finishing parameters and for adjusting finishing parameters in response to printing parameters, wherein the feedback control structure comprises:

a controller configured for directing operation of the printing device and the finishing device using the adjusted printing parameters and the finishing parameters, respectively;

a two-way communication channel between the printing device and the controller; and a two-way communication channel between the finishing device and the controller;

wherein the controller determines substrate parameters for a substrate for the print, based on a prior selection of the substrate and monitoring of parameters of substrates available to the printing device, and the controller determines ink deposition parameters that are determined in part by the substrate parameters, and the controller determines drying parameters, and the controller determines finishing parameters based in part on the substrate parameters, the ink deposition parameters and the drying parameters:

wherein the printing device communicates parameters to, and receives adjusted parameters from, the controller to produce a print, which is finished by the finishing device after communicating parameters to, and receiving adjusted parameters from, the controller.

11. The system of claim 10, wherein the feedback control structure is configured for sharing printing parameters and finishing parameters in the two-way communications channels and for adjusting the printing parameters and the finishing parameters in response to shared parameters.

12. The system of claim 10, wherein the feedback control structure utilizes algorithms executed by the controller for adjusting the printing parameters and the finishing parameters in response to parameters shared by the printing device and the finishing device.

13. The system of claim 10, wherein the feedback control structure comprises:

a printing application module, defined in memory within the controller, comprising algorithms using both printing parameters and finishing parameters as input; and a finishing application module, defined in memory within the controller, comprising algorithms using both printing parameters and finishing parameters as input.

14. The system of claim 13, wherein:

the controller obtains parameters from the printing application module and the finishing application module; and the obtained parameters are used in an algorithm configured to adjust the printing parameters and to adjust the finishing parameters.

15. The system of claim 10, wherein operation of the printing device is directed by the controller using an algorithm adapted for use of parameters obtained by two-way communication with both the printing device and the finishing device.

16. The system of claim 15, wherein the parameters used comprise information on substrate absorbency, substrate gloss and information on ink colorant.

17. The system of claim 10, wherein operation of the finishing device is directed by the controller using an algorithm adapted for use of parameters obtained by two-way communication with both the printing device and the finishing device.

18. The system of claim 17, wherein the parameters used comprise information on finishing material and information on a finishing process.

19. A method of printing and finishing, comprising:

receiving print parameters obtained from a printing device;

receiving finishing parameters obtained from a finishing device;

adjusting at least one of the printing parameters based in part on at least one of the received finishing parameters, wherein adjusting the print parameters is performed by a controller configured for two-way communication with the printing device and the finishing device, wherein the controller determines substrate parameters for a substrate for a print, based on a prior selection of the substrate and monitoring of parameters of substrates available to the printing device, and the controller determines ink deposition parameters that are determined in part by the substrate parameters, and the controller determines drying parameters, and the controller determines finishing parameters based in part on the substrate parameters, the ink deposition parameters and the drying parameters;

adjusting at least one of the finishing parameters based in part on at least one of the received printing parameters;

printing the print based on the adjusted printing parameters; and finishing the print based on the adjusted finishing parameters, wherein the controller adjusts a buffer of printed material between the printing device and the finishing device, wherein the buffer of printed material is queued to go to the finishing device and wherein the buffer adjustment is based on the two-way communication between the printing device and the finishing device.

20. The method of claim 19, wherein receiving the print and finishing parameters is performed by a controller configured for two-way communication with the printing device and the finishing device.

21. The method of claim 19, wherein adjusting the printing parameters comprises adjusting the printing parameters based in part upon knowledge of a finishing material to be used by the finishing device.

22. The method of claim 19, wherein the finishing parameters are adjusted based in part upon knowledge of a substrate material used by the printing device.

23. The method of claim 19, wherein printing the print is based in part on a gloss applied to the print by the finishing device, wherein the gloss was disclosed in a parameter received by a controller performing the method of printing and finishing.

24. The method of claim 19, additionally comprising: adjusting a printing speed and a finishing speed so that the finishing speed does not overrun the printing speed.

25. The method of claim 19, additionally comprising:

monitoring temperature at a nip roller in the finishing device; and adjusting energy input to the nip roller in the finishing device, a feed rate to the finishing device and a nip roller pressure at the finishing device.

26. A method of printing and finishing, comprising:

receiving print parameters obtained from a printing device;

receiving finishing parameters obtained from a finishing device;

providing feedback that adjusts at least one of the printing parameters, wherein the feedback is based on review of both print parameters and finishing parameters;

providing feedback that adjusts at least one of the finishing parameters, wherein the feedback is based on review of both print parameters and finishing parameters, wherein the feedback is made to a controller that determines substrate parameters for a substrate for a print, based on a prior selection of the substrate and monitoring of parameters of substrates available to the printing device, and the controller determines ink deposition parameters that are determined in part by the substrate parameters, and the controller determines drying parameters, and the controller determines finishing parameters based in part on the substrate parameters, the ink deposition parameters and the drying parameters;

printing a print based on the printing parameters; and finishing the print based on the adjusted finishing parameters, wherein the controller regulates a buffer of printed material between the printing device and the finishing device, wherein the buffer of printed material is queued to go to the finishing device and wherein the buffer regulation is based on the two-way communication between the printing device and the finishing device.

27. The method of claim 26, wherein the receiving of the parameters and the adjusting of the parameters is performed by a controller configured for two-way communication with the printing device and the finishing device.

28. The method of claim 26, wherein adjusting the printing parameters are adjusted based in part upon knowledge of a finishing material to be used by the finishing device.

29. The method of claim 26, wherein parameters used for printing the print are based in part on a gloss applied to the print by the finishing device, wherein the gloss was disclosed in a parameter received by a controller performing the method of printing and finishing.

30. The method of claim 26, additionally comprising:

adjusting a printing speed and a finishing speed so that the finishing speed does not overrun the printing speed.

31. The method of claim 26, additionally comprising:

monitoring temperature at a nip roller in the finishing device; and adjusting energy input to the nip roller, a feed rate to the finishing device and a nip roller pressure.

* * * * *

UNITED STATES PATENT AND TRADEMARK OFFICE

CERTIFICATE OF CORRECTION

PATENT NO. : 7,463,376 B2

APPLICATION NO. : 10/060449

DATED : December 9, 2008

INVENTOR(S) : Myron A. Bezenek

It is certified that error appears in the above-identified patent and that said Letters Patent is hereby corrected as shown below:

In column 11, line 39, delete “(58 ft$^{2/hr) at}$” and insert -- (58 ft$^2$/hr) at --, therefor.

In column 14, line 12, in Claim 1, delete “device:” and insert -- device; --, therefor.

In column 15, line 18, in Claim 10, delete “parameters:” and insert -- parameters; --, therefor.

Signed and Sealed this

Fourteenth Day of April, 2009

JOHN DOLL

*Acting Director of the United States Patent and Trademark Office*